US008503988B2

(12) United States Patent
Sigmund et al.

(10) Patent No.: US 8,503,988 B2
(45) Date of Patent: *Aug. 6, 2013

(54) SYSTEMS AND METHODS FOR PROVIDING A PASSWORD RESET FEATURE

(71) Applicant: AT&T Mobility II LLC, Atlanta, GA (US)

(72) Inventors: William Joseph Sigmund, Cumming, GA (US); Michael Robert Zubas, Marietta, GA (US); Brian Keith Rainer, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/751,505

(22) Filed: Jan. 28, 2013

(65) Prior Publication Data

US 2013/0137397 A1   May 30, 2013

Related U.S. Application Data

(63) Continuation of application No. 12/160,940, filed as application No. PCT/US2008/061493 on Apr. 25, 2008, now Pat. No. 8,401,526.

(60) Provisional application No. 60/969,419, filed on Aug. 31, 2007.

(51) Int. Cl.
*H04M 11/10* (2006.01)
*H04M 1/64* (2006.01)

(52) U.S. Cl.
USPC ............................................. 455/413; 379/88

(58) Field of Classification Search
USPC .............. 455/411, 412.1, 412.2, 413; 379/88
See application file for complete search history.

(56) References Cited

U.S. PATENT DOCUMENTS 5,329,579 A   7/1994   Brunson
5,524,137 A   6/1996   Rhee
5,572,578 A   11/1996  Lin et al.
(Continued)

FOREIGN PATENT DOCUMENTS

EP    0 631 452   12/1994
EP    1 113 631    7/2001
(Continued)

OTHER PUBLICATIONS

U.S. Notice of Allowance dated May 26, 2011 in U.S. Appl. No. 12/201,945.

(Continued)

*Primary Examiner* — Kent Chang
*Assistant Examiner* — Scott Au
(74) *Attorney, Agent, or Firm* — Hartman & Citrin LLC

(57) ABSTRACT

A method for providing a voicemail password reset feature can include receiving a password reset request message from a mobile device at a voicemail system, resetting a current password to a default password at the voicemail system, and sending a response message request to a short message service center. The response message request can include a request to generate a response message that includes the default password. The method can further include generating the response message at the short message center and sending the response message to the mobile device, wherein the response message includes the default password. A system for providing a voicemail password reset feature and a computer-readable medium for initiating a voicemail password reset from a mobile device.

20 Claims, 5 Drawing Sheets

U.S. PATENT DOCUMENTS

| | | | |
|---|---|---|---|
| 5,737,394 | A | 4/1998 | Anderson et al. |
| 5,737,395 | A | 4/1998 | Irribarren |
| 5,809,111 | A | 9/1998 | Matthews |
| 6,005,870 | A | 12/1999 | Leung et al. |
| 6,108,559 | A | 8/2000 | Astrom et al. |
| 6,148,212 | A | 11/2000 | Park et al. |
| 6,246,871 | B1 | 6/2001 | Ala-Laurila |
| 6,335,962 | B1 | 1/2002 | Ali et al. |
| 6,351,523 | B1 | 2/2002 | Detlef |
| 6,360,272 | B1 | 3/2002 | Lincke et al. |
| 6,480,885 | B1 | 11/2002 | Olivier |
| 6,522,727 | B1 | 2/2003 | Jones |
| 6,751,298 | B2 | 6/2004 | Bhogal et al. |
| 6,829,334 | B1 | 12/2004 | Zirngibl |
| 6,879,847 | B1 | 4/2005 | Kato et al. |
| 6,912,275 | B1 | 6/2005 | Kaplan |
| 6,937,868 | B2 | 8/2005 | Himmel et al. |
| 6,981,023 | B1 | 12/2005 | Hamilton et al. |
| 7,095,828 | B1 | 8/2006 | Elliot et al. |
| 7,142,648 | B1 | 11/2006 | Miller |
| 7,171,186 | B2 | 1/2007 | Miyachi et al. |
| 7,248,857 | B1 | 7/2007 | Richardson et al. |
| 7,277,529 | B1 | 10/2007 | Wuthnow et al. |
| 7,283,809 | B1 | 10/2007 | Weinman |
| 7,369,648 | B1 | 5/2008 | Chang |
| 7,680,491 | B2 | 3/2010 | Zabawskyj et al. |
| 7,738,833 | B2 | 6/2010 | Bettis et al. |
| 7,796,977 | B2 | 9/2010 | Vander Veen |
| 7,826,831 | B2 | 11/2010 | Bettis et al. |
| 7,894,580 | B2 | 2/2011 | Veen et al. |
| 8,320,535 | B2 | 11/2012 | Alperin et al. |
| 2002/0015403 | A1 | 2/2002 | McConnell et al. |
| 2002/0037075 | A1 | 3/2002 | Flanagan |
| 2002/0049768 | A1 | 4/2002 | Peek et al. |
| 2002/0077098 | A1 | 6/2002 | Tilks et al. |
| 2002/0112007 | A1 | 8/2002 | Wood et al. |
| 2002/0115429 | A1 | 8/2002 | Deluca et al. |
| 2003/0091169 | A1 | 5/2003 | Cain |
| 2003/0099341 | A1 | 5/2003 | Williams |
| 2003/0220784 | A1 | 11/2003 | Fellenstein et al. |
| 2004/0023643 | A1 | 2/2004 | Vander Veen et al. |
| 2004/0081088 | A1 | 4/2004 | Schinner et al. |
| 2004/0139471 | A1 | 7/2004 | Geen et al. |
| 2004/0146147 | A1 | 7/2004 | Picard et al. |
| 2004/0248594 | A1 | 12/2004 | Wren |
| 2004/0252679 | A1 | 12/2004 | Williams et al. |
| 2004/0264658 | A1 | 12/2004 | Cline et al. |
| 2005/0089149 | A1 | 4/2005 | Elias |
| 2005/0102368 | A1 | 5/2005 | Forman et al. |
| 2005/0113078 | A1 | 5/2005 | Deitrich |
| 2005/0186944 | A1 | 8/2005 | True et al. |
| 2005/0213715 | A1 | 9/2005 | Winick |
| 2006/0003745 | A1 | 1/2006 | Gogic |
| 2006/0025114 | A1 | 2/2006 | Bales et al. |
| 2006/0025140 | A1 | 2/2006 | Bales et al. |
| 2006/0031470 | A1 | 2/2006 | Chen et al. |
| 2006/0059361 | A1 | 3/2006 | Paden et al. |
| 2006/0062356 | A1 | 3/2006 | Vendrow et al. |
| 2006/0171511 | A1 | 8/2006 | Liu et al. |
| 2006/0173959 | A1 | 8/2006 | McKelvie et al. |
| 2006/0239419 | A1 | 10/2006 | Joseph et al. |
| 2006/0251222 | A1 | 11/2006 | Abramson et al. |
| 2006/0253584 | A1 | 11/2006 | Dixon et al. |
| 2006/0281443 | A1 | 12/2006 | Chen et al. |
| 2007/0038483 | A1 | 2/2007 | Wood |
| 2007/0066284 | A1 | 3/2007 | Gatzke et al. |
| 2007/0127632 | A1 | 6/2007 | Swingle et al. |
| 2007/0127663 | A1 | 6/2007 | Bae |
| 2007/0140443 | A1 | 6/2007 | Woodring |
| 2007/0143106 | A1 | 6/2007 | Dunsmuir |
| 2007/0173233 | A1 | 7/2007 | Vander Veen et al. |
| 2007/0180032 | A1 | 8/2007 | Pearson |
| 2007/0180504 | A1 | 8/2007 | Hung |
| 2007/0207785 | A1 | 9/2007 | Chatterjee et al. |
| 2007/0213050 | A1 | 9/2007 | Jiang |
| 2007/0223666 | A1 | 9/2007 | Teague |
| 2007/0287453 | A1 | 12/2007 | Wang |
| 2008/0008163 | A1 | 1/2008 | Castell et al. |
| 2008/0008299 | A1 | 1/2008 | Didcock et al. |
| 2008/0056459 | A1 | 3/2008 | Vallier et al. |
| 2008/0062246 | A1 | 3/2008 | Woodworth et al. |
| 2008/0062938 | A1 | 3/2008 | Gil-soo et al. |
| 2008/0081609 | A1 | 4/2008 | Burgan et al. |
| 2008/0140767 | A1 | 6/2008 | Rao et al. |
| 2008/0167007 | A1 | 7/2008 | Novick et al. |
| 2008/0167010 | A1 | 7/2008 | Novick et al. |
| 2008/0167014 | A1 | 7/2008 | Novick et al. |
| 2008/0188204 | A1 | 8/2008 | Gavner et al. |
| 2008/0200152 | A1 | 8/2008 | Moore |
| 2008/0207176 | A1 | 8/2008 | Brackbill et al. |
| 2008/0243513 | A1 | 10/2008 | Bucchieri et al. |
| 2008/0260118 | A1 | 10/2008 | Lyle |
| 2008/0298459 | A1 | 12/2008 | Yang et al. |
| 2008/0300873 | A1 | 12/2008 | Siminoff |
| 2009/0149220 | A1 | 6/2009 | Camilleri et al. |
| 2009/0239507 | A1 | 9/2009 | Sigmund et al. |
| 2009/0253407 | A1 | 10/2009 | Sigmund et al. |
| 2009/0253412 | A1 | 10/2009 | Sigmund et al. |
| 2009/0253413 | A1 | 10/2009 | Sigmund et al. |
| 2010/0159886 | A1 | 6/2010 | Sigmund et al. |
| 2010/0159888 | A1 | 6/2010 | Sigmund et al. |
| 2010/0159889 | A1 | 6/2010 | Sigmund et al. |
| 2010/0159890 | A1 | 6/2010 | Sigmund et al. |
| 2010/0159891 | A1 | 6/2010 | Sigmund et al. |
| 2010/0166161 | A1 | 7/2010 | Dhawan et al. |
| 2010/0167699 | A1 | 7/2010 | Sigmund et al. |
| 2010/0189229 | A1 | 7/2010 | Sigmund et al. |
| 2010/0195807 | A1 | 8/2010 | Sigmund et al. |
| 2010/0222024 | A1 | 9/2010 | Sigmund et al. |
| 2011/0085646 | A1 | 4/2011 | Sigmund et al. |
| 2013/0010937 | A1 | 1/2013 | Sigmund et al. |
| 2013/0012173 | A1 | 1/2013 | Sigmund et al. |
| 2013/0040614 | A1 | 2/2013 | Sigmund et al. |

FOREIGN PATENT DOCUMENTS

| | | |
|---|---|---|
| EP | 1 434 415 | 6/2004 |
| EP | 1 599 022 | 11/2005 |
| KR | 20050001246 | 1/2005 |
| WO | WO 97/45991 | 12/1997 |
| WO | WO 98/03005 | 1/1998 |
| WO | WO 00/73947 | 12/2000 |
| WO | WO 02/065745 | 8/2002 |
| WO | WO 2004/046895 | 6/2004 |
| WO | WO 2007/081929 | 7/2007 |
| WO | WO 2007/095510 | 8/2007 |
| WO | WO 2007/096866 | 8/2007 |
| WO | WO 2008/034555 | 3/2008 |
| WO | WO 2009/029296 | 3/2009 |
| WO | WO 2009/029297 | 3/2009 |
| WO | WO 2009/029298 | 3/2009 |
| WO | WO 2009/029313 | 3/2009 |
| WO | WO 2009/029314 | 3/2009 |
| WO | WO 2009/029323 | 3/2009 |
| WO | WO 2009/029324 | 3/2009 |
| WO | WO 2009/029328 | 3/2009 |
| WO | WO 2009/029330 | 3/2009 |
| WO | WO 2010/002382 | 1/2010 |

OTHER PUBLICATIONS

U.S. Official Action dated Sep. 19, 2011 in U.S. Appl. No. 12/477,971.
U.S. Official Action dated Apr. 25, 2012 in U.S. Appl. No. 12/477,971.
U.S. Notice of Allowance dated Nov. 21, 2012 in U.S. Appl. No. 12/477,971.
U.S. Official Action dated Oct. 13, 2011 in U.S. Appl. No. 12/485,335.
U.S. Official Action dated May 22, 2012 in U.S. Appl. No. 12/485,335.
U.S. Notice of Allowance dated Nov. 23, 2012 in U.S. Appl. No. 12/485,335.
U.S. Official Action dated Oct. 4, 2012 in U.S. Appl. No. 12/485,484.
U.S. Official Action dated Oct. 2, 2012 in U.S. Appl. No. 12/485,961.
U.S. Official Action dated Apr. 27, 2012 in U.S. Appl. No. 12/160,931.

U.S. Official Action dated Aug. 30, 2012 in U.S. Appl. No. 12/160,931.
U.S. Official Action dated Dec. 22, 2010 in U.S. Appl. No. 12/160,940.
U.S. Official Action dated May 31, 2011 in U.S. Appl. No. 12/160,940.
U.S. Official Action dated Apr. 24, 2012 in U.S. Appl. No. 12/160,940.
U.S. Notice of Allowance dated Oct. 25, 2012 in U.S. Appl. No. 12/160,940.
U.S. Official Action dated Apr. 26, 2012 in U.S. Appl. No. 12/160,946.
U.S. Official Action dated Oct. 11, 2012 in U.S. Appl. No. 12/160,946.
U.S. Official Action dated Nov. 4, 2011 in U.S. Appl. No. 12/160,956.
U.S. Official Action dated Jun. 6, 2012 in U.S. Appl. No. 12/160,956.
U.S. Official Action dated Jan. 12, 2011 in U.S. Appl. No. 12/161,021.
U.S. Official Action dated Jun. 1, 2011 in U.S. Appl. No. 12/161,021.
U.S. Official Action dated Dec. 15, 2011 in U.S. Appl. No. 12/161,021.
U.S. Official Action dated Jun. 21, 2012 in U.S. Appl. No. 12/161,021.
U.S. Official Action dated Nov. 29, 2010 in U.S. Appl. No. 12/161,027.
U.S. Official Action dated May 10, 2011 in U.S. Appl. No. 12/161,027.
U.S. Official Action dated Nov. 23, 2011 in U.S. Appl. No. 12/161,027.
U.S. Official Action dated Jul. 30, 2012 in U.S. Appl. No. 12/161,027.
U.S. Notice of Allowance dated Nov. 16, 2012 in U.S. Appl. No. 12/161,027.
U.S. Official Action dated Dec. 27, 2010 in U.S. Appl. No. 12/161,033.
U.S. Official Action dated May 31, 2011 in U.S. Appl. No. 12/161,033.
U.S. Official Action dated Nov. 29, 2011 in U.S. Appl. No. 12/161,033.
U.S. Official Action dated Jun. 6, 2012 in U.S. Appl. No. 12/161,033.
U.S. Notice of Allowance dated Jul. 24, 2012 in U.S. Appl. No. 12/161,033.
U.S. Official Action dated Dec. 23, 2010 in U.S. Appl. No. 12/161,035.
U.S. Official Action dated Jun. 2, 2011 in U.S. Appl. No. 12/161,035.
U.S. Official Action dated Dec. 2, 2011 in U.S. Appl. No. 12/161,035.
U.S. Official Action dated Jul. 18, 2012 in U.S. Appl. No. 12/161,035.
U.S. Official Action dated Jan. 24, 2011 in U.S. Appl. No. 12/161,064.
U.S. Official Action dated Jul. 8, 2011 in U.S. Appl. No. 12/161,064.
U.S. Official Action dated Jan. 30, 2012 in U.S. Appl. No. 12/161,064.
U.S. Official Action dated Sep. 14, 2012 in U.S. Appl. No. 12/161,064.
U.S. Official Action dated Jan. 19, 2011 in U.S. Appl. No. 12/161,076.
U.S. Official Action dated Jul. 1, 2011 in U.S. Appl. No. 12/161,076.
U.S. Official Action dated Jan. 17, 2012 in U.S. Appl. No. 12/161,076.
U.S. Notice of Allowance dated Jul. 17, 2012 in U.S. Appl. No. 12/161,076.
U.S. Notice of Allowance dated Dec. 27, 2012 in U.S. Appl. No. 13/616,198.
International Search Report & Written Opinion dated Sep. 18, 2008 in PCT Application PCT/US08/67612.
International Search Report & Written Opinion dated Aug. 1, 2008 in PCT Application PCT/US08/61493.
International Search Report & Written Opinion dated Nov. 12, 2008 in PCT Application PCT/US08/65046.
International Search Report & Written Opinion dated Mar. 13, 2009 in PCT Application PCT/US08/68738.
International Search Report & Written Opinion dated Oct. 29, 2008 in PCT Application PCT/US08/67176.
International Search Report & Written Opinion dated Sep. 4, 2008 in PCT Application PCT/US08/54074.
International Search Report & Written Opinion dated Sep. 3, 2008 in PCT Application PCT/US08/61592.
International Search Report & Written Opinion dated Sep. 4, 2008 in PCT Application PCT/US08/67152.
International Search Report & Written Opinion dated Nov. 6, 2008 in PCT Application PCT/US08/67591.
International Search Report & Written Opinion dated Aug. 28, 2008 in PCT Application PCT/US08/61437.
U.S. Patent Application filed Mar. 5, 2013 in U.S. Appl. No. 13/785,710.
U.S. Notice of Allowance dated Jan. 31, 2013 in U.S. Appl. No. 12/485,961.
U.S. Notice of Allowance dated Feb. 28, 2013 in U.S. Appl. No. 12/161,064.
Office Action dated Feb. 28, 2013 in U.S. Appl. No. 13/654,480.

SYSTEMS AND METHODS FOR PROVIDING A PASSWORD RESET FEATURE

RELATED APPLICATION

This application is a continuation of U.S. patent application Ser. No. 12/160,940, entitled "Systems and Methods for Providing a Password Reset Feature," filed Jul. 15, 2008, now U.S. Pat. No. 8,401,526, which is a 35 U.S.C. §371 National Stage Entry of PCT/US2008/061493, which claims priority to U.S. Provisional Patent Application Ser. No. 60/969,419, filed Aug. 31, 2007, the entirety of each of which are hereby incorporated by reference.

TECHNICAL FIELD

The present disclosure relates generally to voicemail and, more particularly, to providing a voicemail password reset feature.

BACKGROUND

Voicemail systems allow a caller to leave a voice message if the desired recipient is unavailable. Traditional voicemail systems (referred to herein as plain old voicemail or POVM) allow a subscriber to place a call to a voicemail system to access messages stored in his or her voicemail box. This is done through a telephone user interface (TUI) that facilitates interaction between the subscriber and the voicemail system. The TUI provides functions for the subscriber to listen to messages, skip messages, delete messages, and save messages. The TUI can also provide functions for the subscriber to set a voicemail greeting, record a voicemail greeting, record a name, and set/change a password.

With some voicemail systems, a subscriber with multiple voicemail messages is required to listen to, skip, delete, or save each message while reviewing the voicemail box. This is time consuming and can be frustrating for the subscriber in situations where an important message has been deposited, requiring the subscriber to listen to, skip, delete or save each message in search of the important message.

To help reduce the need to search through multiple messages, various improved voicemail systems have been developed that allow messages to be stored based on a priority scheme to increase the efficiency of listening to voicemail messages. Often, these systems use a telephone number of the caller to identify a priority for a message and position the voicemail messages in order based on the assigned priorities. When the recipient accesses the voicemail system to acquire voicemail messages, the recipient is presented with each voicemail message in order of the priority or importance to the recipient. This reduces unwanted listening or skipping through multiple voicemail messages to find an important message. However, an important message can easily be relegated to a position of low importance if the subscriber has not previously set the priority for the caller. In this system, the priority for an incoming voicemail message is determined directly by the telephone number associated with the caller.

The aforementioned systems often fail to allow a subscriber to select the exact voicemail message the subscriber would like to hear. Further, the aforementioned systems require the use of a TUI to access the voicemail system to listen to voicemail messages and manage a voicemail account. Still further, these systems merely notify a subscriber of a pending voicemail message with a message waiting indicator (MWI) and require that the subscriber access the voicemail system to retrieve the pending message(s).

Thus, it is desirable to create new enhanced voicemail systems and novel methods for providing visual voicemail (VVM) services. Moreover, there is a need to be able to reset a voicemail password directly from a subscriber's mobile device.

SUMMARY

A method for providing a voicemail password reset feature can include receiving a password reset request message from a mobile device at a voicemail system, resetting a current password to a default password at the voicemail system, and sending a response message request to a short message service center (SMSC). The response message request can include a request to generate a response message that includes the default password. The method can further include generating the response message at the short message service center and sending the response message to the mobile device. The response message can include the default password.

The aforementioned method can further include generating the password reset request message at the mobile device in response to an input received on the mobile device.

In one embodiment, the password reset request message is an unstructured supplementary service data (USSD) message. In another embodiment, the password reset request message is a short message service (SMS) message.

In one embodiment, the response message is an unstructured USSD message. In another embodiment, the response message is a SMS message.

A system for providing a voicemail password reset feature includes a mobile device that can be configured to generate a password reset request message in response to an input and send the password reset request to a voicemail server. The voicemail server can be configured to receive the password reset request message, reset a current password to a default password, and send a response message request to a short message service center. The response message request can include a request to generate a response message that includes the default password. The short message service center can be configured to generate the response message and send the response message including the default password to the mobile device.

In one embodiment, the password reset request message is an unstructured supplementary service data (USSD) message. In another embodiment, the password reset request message is a short message service (SMS) message.

In one embodiment, the response message is an unstructured USSD message. In another embodiment, the response message is a SMS message.

A computer-readable medium on a mobile device includes computer-executable instructions that, when executed, perform the steps of receiving a selection of an option to reset a voicemail password and generating a password reset request message based upon the selection. The password reset request can include a request to reset a password from a current password to a default password. The computer-readable medium can further include instructions to perform the steps of sending the password reset request message to a voicemail system and receiving a response message including the default password.

In one embodiment, the password reset request message is an unstructured supplementary service data (USSD) message. In another embodiment, the password reset request message is a short message service (SMS) message.

In one embodiment, the response message is an unstructured USSD message. In another embodiment, the response message is a SMS message.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
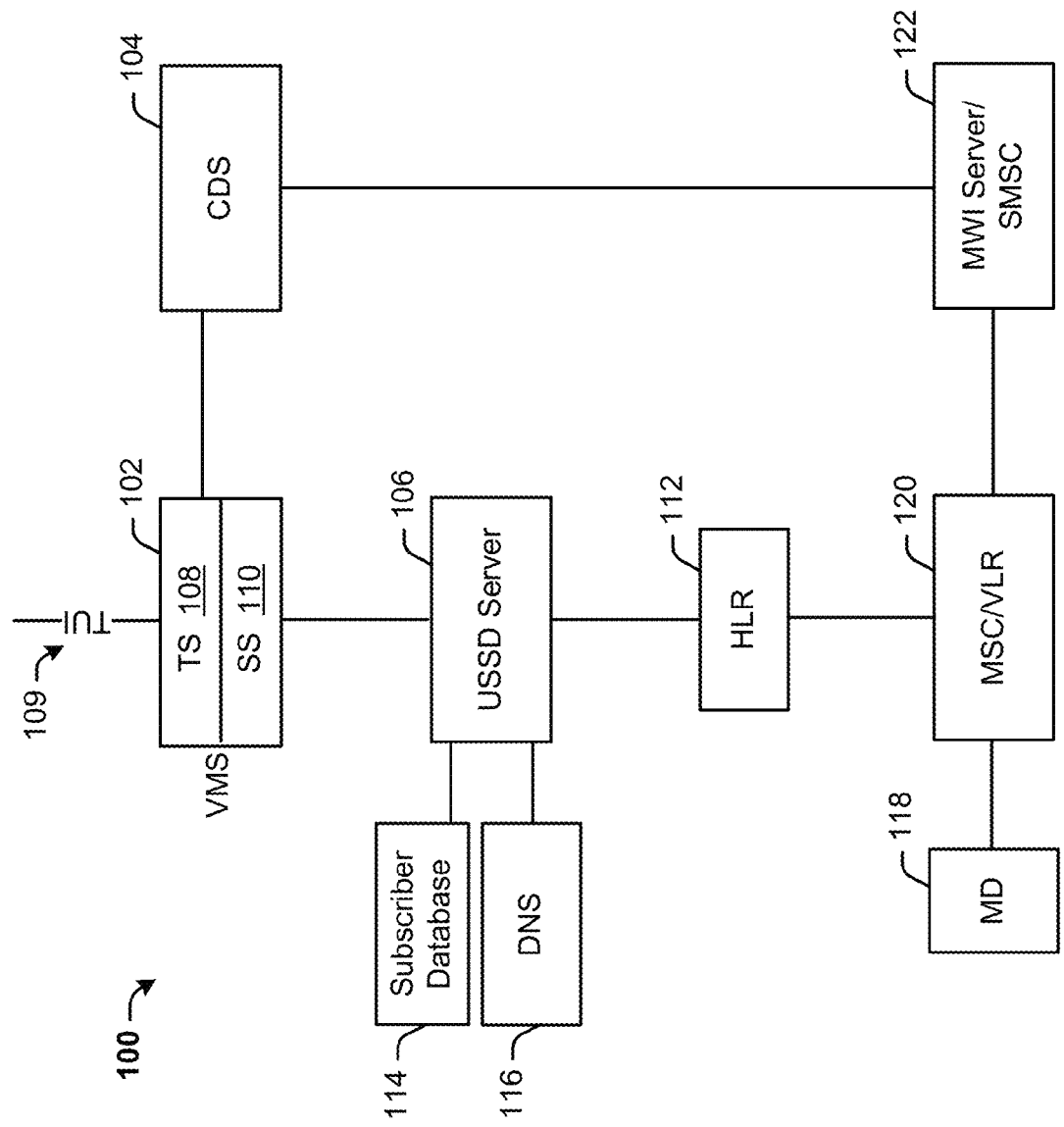
FIG. 1 illustrates a portion of an exemplary network in which some concepts the present disclosure can be practiced.

Referring now to the drawings wherein like numerals represent like elements throughout the several views, FIG. 1 schematically illustrates a portion of an exemplary wireless communications network 100 in which embodiments of the present disclosure can be implemented. By way of example, the wireless communications network 100 can be configured as a 2G GSM (Global System for Mobile communications) network and can provide data communications via GPRS (General Packet Radio Service), and EDGE (Enhanced Data rates for GSM Evolution). By way of further example, the wireless communications network 100 can be configured as a 3G UMTS (Universal Mobile Telecommunications System) network and provide data communications via the HSPA (High-Speed Packet Access) protocol family, such as, HSDPA (High-Speed Downlink Packet Access), EUL (Enhanced Uplink) or otherwise termed HSUPA (High-Speed Uplink Packet Access), and HSPA+ (Evolved HSPA). The wireless communications network 100 is also compatible with future mobile communications standards including, but not limited to, pre-4G and 4G, for example. The wireless communications network 100 can be configured to provide messaging services via Short Message Service (SMS), Multimedia Message Service (MMS), instant messaging and unstructured supplementary service data (USSD), for example. The wireless communications network 100 can also be configured to provide advanced voicemail messaging features, such as visual voicemail.

The illustrated wireless communications network 100 includes a voicemail system (VMS) 102 that is illustrated as being in communication with a content delivery server (CDS) 104 and an unstructured supplementary service data (USSD) server 106. The VMS 102 can include a telephony server (TS) 108 for handling incoming voicemail inquiries via a telephone user interface (TUI) 109 and a storage server (SS) 110 for storing and managing voicemail messages for a plurality of voicemail accounts. The USSD server 106 can be configured to receive, decode, and process new USSD messages; perform database queries to retrieve the VMS hostname serving a subscriber; perform database queries to resolve the VMS hostname to the corresponding IP address; obtain the subscriber's voicemail class of service (COS); and send the subscriber's voicemail COS to the subscriber's mobile device. The USSD server 106 is illustrated as being in communication with a home location register (HLR) 112, a subscriber database 114, and a domain name server (DNS) 116 to facilitate these functions. The USSD server 106 can be further configured to handle a password reset request message received from the MD 118. A password reset request message can be used to reset a voicemail password directly from the MD 118 without the need to call the VMS 102 via the TUI 109. The MD 118 can be, but is not limited to, a user equipment, a mobile terminal, a cellular telephone, a personal digital assistant (PDA), a handheld computer, or combinations thereof, and the like.

The subscriber database 114 can be configured to store and manage subscriber data, such as, for example, account information, billing information, services information, and equipment information for a plurality of subscribers. The DNS server 116 can be configured to maintain a database for resolving host names and IP addresses for various network nodes, such as the VMS 102, for example. The USSD server 106 can retrieve the VMS hostname serving a subscriber from the subscriber database 114 and query the DNS 116 by specifying the VMS hostname to resolve the corresponding IP address.

The HLR 112 can be configured to provide routing information for mobile-terminated calls and short message service (SMS) messages. The HLR 112 is illustrated as being in communication with a mobile switching center (MSC) and visiting location register (VLR) 120. The MSC/VLR 120 is in communication with the MD 118 and a short message service center (SMSC) 122. The SMSC 122 can be configured to delivery SMS messages and message waiting indicator (MWI) messages.

The VMS 102 can be configured to store a plurality of voicemail accounts. Each voicemail account can include a voicemail box in which voicemail messages can be deposited for a subscriber. The number of voicemail messages capable of being stored per account can be determined by the voicemail service provider or any third party provider, such as the system manufacturer, for example. The maximum voicemail message length can also be set. The number of voicemail messages and the maximum voicemail message length can be configured on the VMS 102.

Prior to a subscriber being provisioned for visual voicemail service, the voicemail box is in a not provisioned state. After being provisioned for visual voicemail service, the subscriber's voicemail box state is changed to provisioned—not initialized to reflect that the subscriber is provisioned for service but has not yet initialized service via a boot message process described later with reference to FIG. 3. After completion of the boot message process, the VMS 102 state can be changed to provisioned—initialized to reflect that the subscriber is provisioned for voicemail service and has completed the first boot access process.

The VMS 102 is accessible via traditional or plain old voicemail (POVM) methods and visual voicemail (VVM) methods described herein. State changes to voicemail messages, whether requested through TUI via POVM methods or directly on the MD via VVM methods, are automatically updated in both the voicemail box and on the subscriber's MD 118. This ensures automatic and full synchronization between the subscriber's MD 118 and the VMS 102 so that the latest voicemail information is stored on the subscriber's MD 118. The subscriber's VMS-hosted voicemail box recognizes and maintains message states for each message such as, but not limited to, an unheard—new state, a skipped state, and a saved—read state. Deleted messages can be deleted from the VMS 102, via the TUI or directly on the MD 118. The message is deleted on both the VMS 102 and the MD 118. However, in an alternative embodiment, deleted messages remain accessible on the MD 118 and/or on the VMS 102 for a specified period of time to allow the message to be recovered in the case of accidental or premature deletion. In other embodiments, the VMS 102 discards all messages after the MD 118 has successfully received and stored the available message content.

The MD 118 voicemail box also recognizes and maintains message states. The MD 118 voicemail box can have message states for each message including, but not limited to, an unheard—new state, a saved—read state, and a deleted state. The MD 118 does not require a skipped state because VVM provides an interface that allows a subscriber to access any message regardless of the order in which the message was received and is not subject to restraint of a priority scheme. As mentioned above, the MD 118 voicemail box deleted state can be configured such that the message is available for recovery or merely as an indication that the message has been deleted. Either of these options can be set to be available for a time specified by either the subscriber via a device input or by the voicemail service provider.

Figure 2:
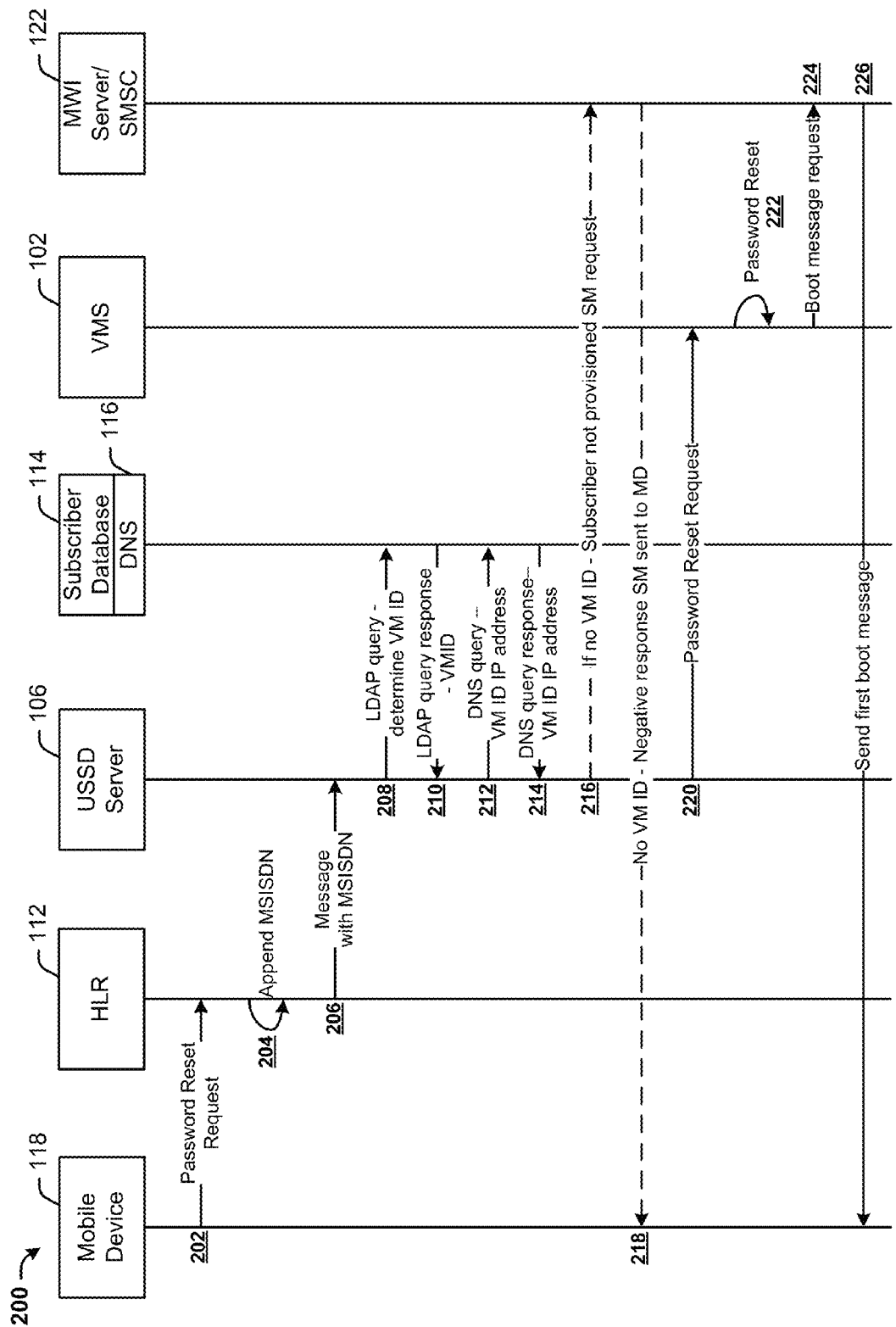
FIG. 2 illustrates an exemplary message flow diagram of a process for handling a password reset request, according to one embodiment of the present disclosure.

Referring now to FIG. 2, an exemplary message flow diagram illustrates a process 200 for handling a password reset request, according to the present disclosure. In the illustrated process 200, messages are sent using a variety of protocols, such as short message peer-to-peer (SMPP), domain name server (DNS) protocol, lightweight directory access protocol (LDAP), unstructured supplementary service data (USSD) protocol, Internet message access protocol version 4 (IMAP4), and hypertext transfer protocol (HTTP), for example. The description provided below assumes an understanding of these protocols and as such further explanation is not provided. The use of alternative protocols or additional protocols to acquire similar results is deemed to be within the scope of the present disclosure. Accordingly, logical variations of the illustrated message flow are contemplated.

In step 202, the mobile device 118 generates a password reset request message and sends the password reset request message to the HLR 112. It should be noted that, in the illustrated embodiment, the password reset request message is a USSD message, however, other messages, for example, an SMS message are contemplated. The HLR 112 receives the password reset request message and appends the mobile subscriber ISDN number (MSISDN) to the password reset request message, in step 204. In step 206, the HLR 112 sends the password reset request message with the appended MSISDN to the USSD server 106. The USSD server 106 receives the message and submits an LDAP query to the subscriber database 114 to determine the hostname of the VMS 102 (VM ID) serving the subscriber, in step 208. In step 210, the subscriber database 114 responds with the proper VM ID. In step 212, the USSD server 106 sends a DNS query to the DNS server 116 to obtain the IP address corresponding to the VM ID. The DNS server 116 resolves the IP address from the VM ID and submits a DNS query response to the USSD server 106 with the IP address for the VMS 102, in step 214. In an alternative embodiment, the IP address for the VMS 102 can be obtained by a data table provisioned on another network element, such as the CDS 104.

If no VM ID is found, the subscriber is not provisioned for voicemail service and the USSD server 106 generates a message to this effect which is sent to the SMSC 122, in step 216. The SMSC 122 receives the message and generates a short message (SM) to be sent to the MD 118 to inform the subscriber of the condition, in step 218.

If a VM ID is found, the USSD server 106 sends a password reset request message to the VMS 102, in step 220. In step 222, the VMS 102 receives the password reset request and resets the password to a new default password. The VMS 102 also generates a boot message request and sends the request to the SMSC 122, in step 224. The boot message request instructs the SMSC 122 to prepare a boot SM including the new default password (reset password). In step 226, the SMSC 122 generates a boot message including the default password and sends the boot message to the MD 118. An exemplary boot message is described now with reference to FIG. 3.

Figure 3:
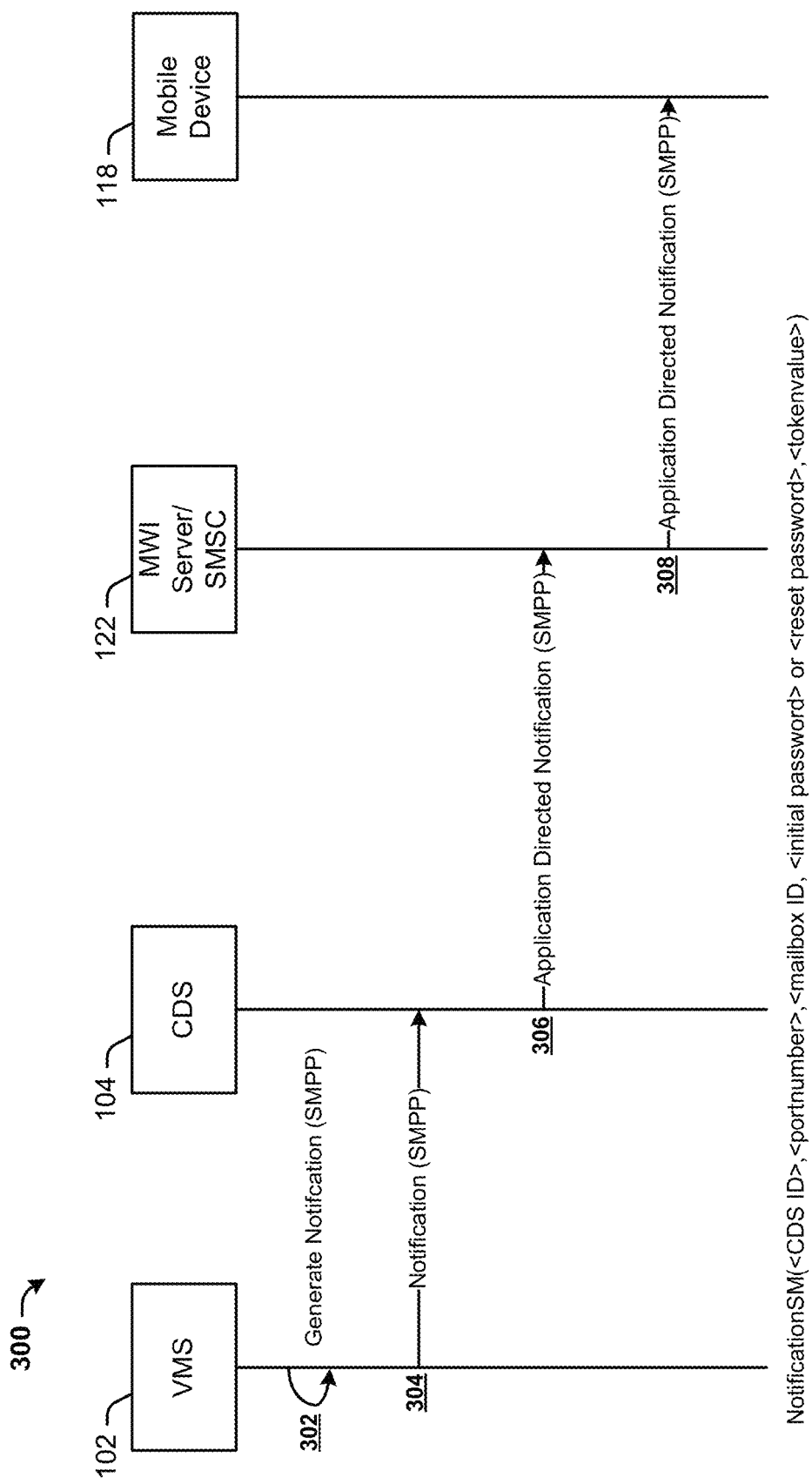
FIG. 3 illustrates an exemplary message flow diagram of a process for handling a boot message in response to a password reset request, according to the present disclosure.

Referring now to FIG. 3, a message flow diagram of an exemplary process 300 for handling a boot message in response to a password reset request is illustrated, according to the present disclosure. The process 300 assumes that the subscriber has been provisioned for VVM service and has the proper voicemail class of service (CoS) for visual voicemail. When the subscriber is initially provisioned to the VMS 102 with a VVM CoS, the subscriber's account can be enabled for voicemail notification via the CDS 104. The VMS 102 can initiate a notification message to the CDS 104 that is intended for delivery to the subscriber's MD 118 via a short message peer-to-peer (SMPP) message. This enables the subscriber to have confirmation that the VVM service is enabled and to immediately access the service via a VVM application. A visual prompt can be presented to the subscriber as a cue or reminder to setup a voicemail box prior to receipt of incoming voice messages. Conventional voicemail, in contrast, blocks receipt of new messages until the mailbox is set up, or notifies the subscriber of the first new voice messages thereby prompting the subscriber to place a call to retrieve them, but bars access to those messages until the subscriber sets up the mailbox. The visual prompt of the present disclosure advantageously eliminates the annoyance and need to access the VMS 102 via the TUI 109 to setup the voicemail box and ensures the subscriber sets up a voicemail box. The notification message can also be used to reset a voicemail password after a voicemail account is enabled.

The VVM service uses several parameters to enable automatic synchronization between the MD 118 and the VMS 102. For example, prior to first boot, the MD 118 does not have the CDS ID, port number, mailbox ID, initial or reset password, and a token value, if applicable. Accordingly, the process 300 described below provides an initial SMPP message including a basic set of parameters for future synchronization sessions including a default password. If a subscriber forgets the password or otherwise needs to have the voicemail password reset, the subscriber can initiate the process 200 described above with reference to FIG. 2 by selecting a password reset option on the MD 118. In this example, a new boot message can be sent to the MD 118 including a new default password in response to a password reset request from the MD 118.

The process 300 begins when the VMS 102 generates an SMPP notification message (notificationSM), in step 302. For example, a notification SM message can include, but is not limited to, the hostname and port number for the subscriber's CDS 104, a token identifying the subscriber's VMS 102, the subscriber's voicemail box ID (mailbox ID) embedded with the token to uniquely identify the subscriber for the VMS 102, and a default password. In an alternative embodiment, the notificationSM can include the IP address and port number for the subscriber's CDS 104 and the mailbox ID. The password and token can be added to increase security and preserve data integrity. If a password is used, the password may be unencrypted and the password can be obscured to hide the actual default password digits.

After the notificationSM message is generated, the VMS 102 can send the message to the CDS 104, in step 304. In step 306, the CDS 104 can receive the notificationSM message and generate a VVM application directed notificationSM message and send the message to the SMSC 122. The SMSC 122 can receive the message and forward the message to the MD 118, in step 308. The application directed short message can be received by the MD 118 and sent directly to the VVM application. The VVM application can inform the subscriber of the new default password.

For situations in which VVM is temporarily unavailable for network maintenance, device maintenance, or other unforeseen circumstances, the VVM subscriber can access voicemail messages via the VMS 102 (e.g., via the TUI 109) as a default access method.

Figure 4:
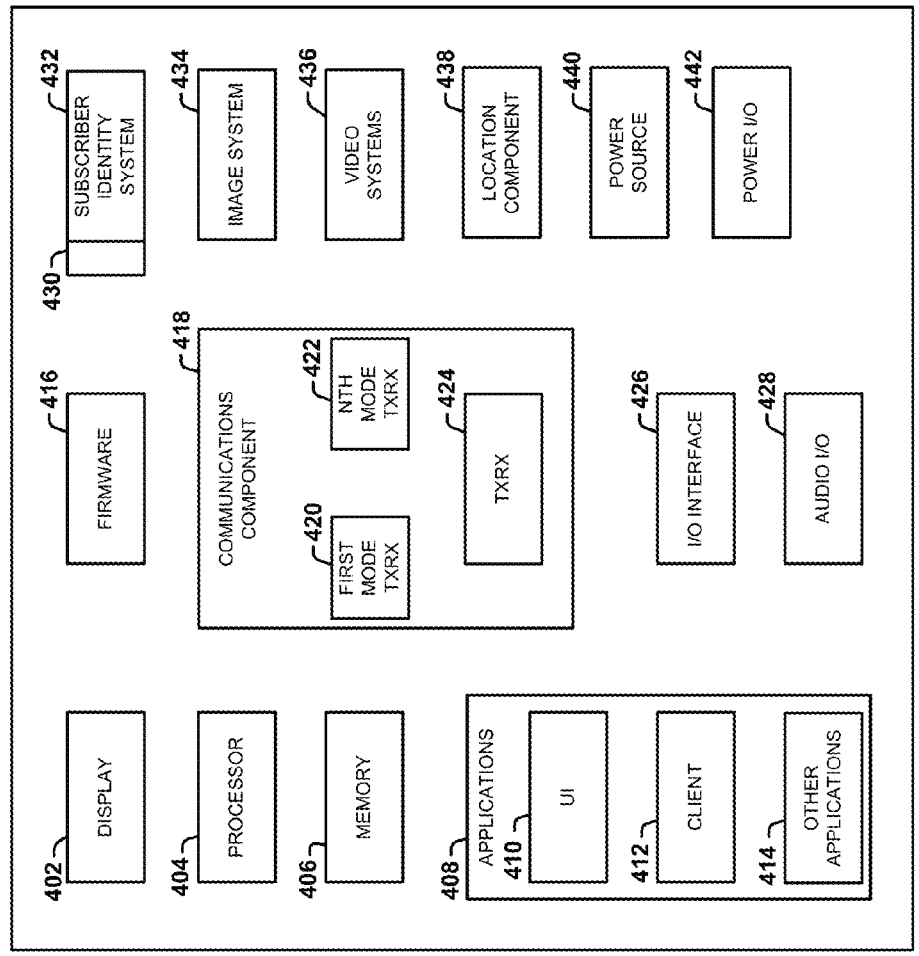
FIG. 4 schematically illustrates an exemplary mobile device and components thereof for use in accordance with an embodiment of the present disclosure.

FIG. 4 is a schematic block diagram illustrating an exemplary mobile device 118 for use in accordance with an exemplary embodiment of the present disclosure. Although no connections are shown between the components illustrated and described in FIG. 4, the components can interact with each other to carry out device functions.

As illustrated, the mobile device 118 can be a multimode handset. FIG. 4 and the following discussion are intended to provide a brief, general description of a suitable environment in which the various aspects of an embodiment of the present disclosure can be implemented. While the description includes a general context of computer-executable instructions, the present disclosure can also be implemented in combination with other program modules and/or as a combination of hardware and software.

Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The illustrated device 118 includes a display 402 for displaying multimedia such as, for example, text, images, video, telephony functions, such as, visual voicemail data, caller line ID data, setup functions, menus, music metadata, messages, wallpaper, graphics, and the like. The display 402 finds particular application in the present disclosure for displaying visual voicemail data in visual voicemail headers. The visual voicemail headers can include the date, time, CLI data, message length, and message status (i.e., new-unread, read, saved, or deleted).

The device 118 can include a processor 404 for controlling, and/or processing data. A memory 406 can interface with the processor 404 for the storage of data and/or applications 408. The memory 406 can include a variety of computer readable media, including volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 118.

The memory 406 can be configured to store one or more applications 408. The applications 408 can include a user interface (UI) application 410. The UI application 410 can interface with a client 412 (e.g., an operating system) to facilitate user interaction with device functionality and data, for example, managing voicemails in a visual voicemail application, answering/initiating calls, entering/deleting data, configuring settings, address book manipulation, multimode interaction, and the like. The applications 408 can include other applications 414 such as, for example, visual voicemail software, add-ons, plug-ins, voice recognition software, call voice processing, voice recording, messaging, e-mail processing, video processing, image processing, music play, combinations thereof, and the like, as well as subsystems and/or components. The applications 408 can be stored in the memory 406 and/or in a firmware 416, and can be executed by the processor 404. The firmware 416 can also store code for execution during initialization of the device 118.

A communications component 418 can interface with the processor 404 to facilitate wired/wireless communications with external systems including, for example, cellular networks, VoIP networks, LAN, WAN, MAN, PAN, that can be implemented using WiFi, WiMax, combinations and/or improvements thereof, and the like. The communications component 418 can also include a multimode communications subsystem for providing cellular communications via different cellular technologies. For example, a first cellular transceiver 420 can operate in one mode, for example, GSM, and an Nth transceiver 422 can operate in a different mode, for example WiFi. While only two transceivers 420, 422 are illustrated, it should be appreciated that a plurality of transceivers can be included. The communications component 418 can also include a transceiver 424 for unlicensed RF communications using technology such as, for example, WiFi, WiMAX, NFC, other RF and the like. The transceiver 424 can also be configured for line-of-sight technologies, such as, for example, infrared and IRDA. Although a single transceiver 424 is illustrated multiple transceivers for unlicensed RF and line-of-sight technologies are contemplated.

The communications component 418 can also facilitate communications reception from terrestrial radio networks, digital satellite radio networks, Internet-based radio services networks, combinations thereof, and the like. The communications component 418 can process data from a network, such as, for example, the Internet, a corporate intranet, a home broadband network, and the like, via an ISP, DSL provider, or other broadband service provider.

An input/output (I/O) interface 426 can be provided for input/output of data and/or signals. The I/O interface 426 can be a hardwire connection, such as, for example, a USB, PS2, IEEE 1394, serial, parallel, IEEE 802.3 (e.g., Ethernet— RJ45, RJ48), traditional telephone jack (e.g., RJ11, RJ14, RJ25) and the like, and can accept other I/O devices, such as, for example, a keyboard, keypad, mouse, interface tether, stylus pen, printer, plotter, jump/thumb drive, touch screen, touch pad, trackball, joy stick, controller, monitor, display, LCD, combinations thereof, and the like.

Audio capabilities can be provided by an audio I/O component 428 that can include a speaker (not shown) for the output of audio signals and a microphone (not shown) to collect audio signals.

The device 118 can include a slot interface 430 for accommodating a subscriber identity system 432, such as, for example, a SIM or universal SIM (USIM). The subscriber identity system 432 instead can be manufactured into the device 118, thereby obviating the need for a slot interface 430.

The device 118 can include an image capture and processing system 434. Photos and/or videos can be obtained via an associated image capture subsystem of the image system 434, for example, a camera. The device 118 can also include a video systems component 436 for processing, recording, and/or transmitting video content.

A location component 438 can be included to send and/or receive signals, such as, for example, GPS data, assisted GPS data, triangulation data, combinations thereof, and the like. The device 118 can use the received data to identify its location or can transmit data used by other devices to determine the device 118 location.

The device 118 can include a power source 440 such as batteries and/or other power subsystem (AC or DC). The power source 440 can be single-use, continuous, or rechargeable. In the case of the latter, the power source 440 can interface with an external power system or charging equipment via a power I/O component 442.

Figure 5:
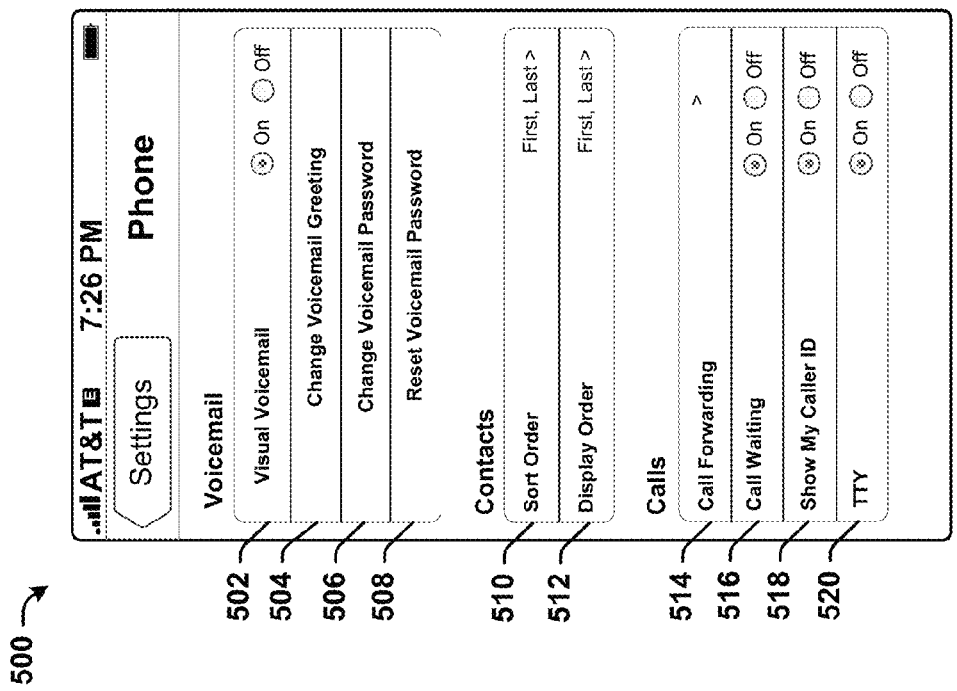
FIG. 5 illustrates an exemplary graphical user interface (GUI) screen for accessing phone functions including an option for resetting a voicemail password, according to the present disclosure.

Referring now to FIG. 5, an exemplary graphical user interface (GUI) screen 500 for accessing phone features including a reset voicemail feature is illustrated, according to the present disclosure. The illustrated GUI screen 500 includes a visual voicemail toggle option 502, a change voicemail greeting option 504, a change voicemail password option 506, and a reset voicemail password option 508. The visual voicemail toggle option 502 allows a user to turn VVM on and off. For example, a user may desire to turn VVM off when roaming internationally due to the high costs associated with international data roaming. The change voicemail greeting option 504 can allow the user to change a voicemail greeting on the MD 118. The change voicemail password option 506 can allow the user to change the voicemail password associated with their VVM service on the MD 118. The reset voicemail password option 508 can allow the user to reset the voicemail password to a default password, for example, as described above with reference to FIGS. 2 and 3.

The illustrated GUI screen 500 also includes a sort order option 510 whereby the user can select the order by which contacts are sorted, and a display order option 512 whereby the user can select the order by which contacts are displayed. The illustrated GUI screen 500 can further include a call forwarding option 514 whereby the user can select a call forwarding number or numbers, a call waiting option 516 whereby the user can enable/disable a call waiting feature, a "show my caller ID" option 518 whereby the user can enable/disable a caller ID feature, and a TTY option 520 whereby the user can enable/disable a TTY feature.

In various embodiments of the present disclosure a user can be authenticated to the VMS 102 via a security mechanism such as, but not limited to, voice recognition, face recognition, personal identification number (PIN), auxiliary password, authentication picture, security question, any combination thereof, and the like. The security mechanism can be included in the password reset request message (best shown in FIG. 2). Alternatively, the security mechanism can be requested by the VMS 102.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method for providing a voicemail password reset feature, the method comprising:
    receiving, at a voicemail system, a password reset request message originating from a home location register, wherein the password reset request message was generated by a mobile device in response to a selection made by way of a visual voicemail interface on the mobile device, and the password request message comprises mobile device information appended by the home location register;
    resetting, by the voicemail system, in response to receiving the password reset request message, a current password to a default password;
    generating, by the voicemail system, a boot message request comprising a request to generate a boot message comprising the default password and instructions directed to a short message service center to instruct the short message service center to send the boot message to the mobile device; and
    sending, by the voicemail system, the boot message request to the short message service center.

2. The method of claim 1, wherein receiving, at the voicemail system, the password reset request message comprises receiving the password reset request message as an unstructured supplementary service data message.

3. The method of claim 1, wherein receiving, at the voicemail system, the password reset request message comprises receiving the password reset request message as a short message service message.

4. The method of claim 1, wherein sending, by the voicemail system, the boot message request to the short message service center comprises sending the boot message request with instructions to send the boot message to the mobile device as an unstructured supplementary service data message.

5. The method of claim 1, wherein sending, by the voicemail system, the boot message request to the short message service center comprises sending the boot message request with instructions to send the boot message to the mobile device as a short message service message.

6. The method of claim 1, wherein the password reset request message comprises a security mechanism.

7. The method of claim 1 further comprising:
    sending, by the voicemail system, a security mechanism request message to the mobile device, the security mechanism request message comprising a request for information relevant to a security mechanism.

8. A voicemail system for providing a voicemail password reset feature, the voicemail system comprising:
    a processor; and
    a memory coupled to the processor, the memory comprising instructions that, when executed by the processor, cause the processor to perform operations comprising receiving a password reset request message from a home location register, wherein the password reset request message was generated by a mobile device in response to a selection made by way of a visual voicemail interface on the mobile device, and the password request message comprises mobile device information appended by the home location register, resetting, in response to receiving the password reset request message, a current password to a default password, generating a boot message request comprising a request to generate a boot message comprising the default password and instructions directed to a short message service center to instruct the short message service center to send the boot message to the mobile device, and sending the boot message request to the short message service center.

9. The voicemail system of claim 8, wherein the password reset request message is an unstructured supplementary service data message.

10. The voicemail system of claim 8, wherein the password reset request message is a short message service message.

11. The voicemail system of claim 8, wherein the boot message is an unstructured supplementary service data message.

12. The voicemail system of claim 8, wherein the boot message is a short message service message.

13. The voicemail system of claim 8, wherein the memory further comprises instructions that, when executed by the processor, cause the processor to perform further operations comprising sending a security mechanism request message to the mobile device, the security mechanism request message comprising a request for information relevant to a security mechanism.

14. The voicemail system of claim 8, wherein the password reset request message comprises a security mechanism.

15. A tangible computer-readable storage medium comprising computer-executable instructions that, when executed, cause a processor to perform operations comprising:

receiving a password reset request message from a home location register, wherein the password reset request message was generated by a mobile device in response to a selection made by way of a visual voicemail interface on the mobile device, and the password request message comprises mobile device information appended by the home location register;

resetting, in response to receiving the password reset request message, a current password to a default password;

generating a boot message request comprising a request to generate a boot message comprising the default password and instructions directed to a short message service center to instruct the short message service center to send the boot message to the mobile device; and sending the boot message request to the short message service center.

16. The tangible computer-readable storage medium of claim 15, wherein receiving the password reset request message comprises receiving the password reset request message as an unstructured supplementary service data message.

17. The tangible computer-readable storage medium of claim 15, wherein receiving the password reset request message comprises receiving the password reset request message as a short message service message.

18. The tangible computer-readable storage medium of claim 15, wherein sending the boot message request to the short message service center comprises sending the boot message request with instructions to send the boot message to the mobile device as an unstructured supplementary service data message.

19. The tangible computer-readable storage medium of claim 15, wherein sending the boot message request to the short message service center comprises sending the boot message request with instructions to send the boot message to the mobile device as a short message service message.

20. The tangible computer-readable storage medium of claim 15, wherein the password reset request message comprises a security mechanism.

* * * * *